Patented Apr. 6, 1954

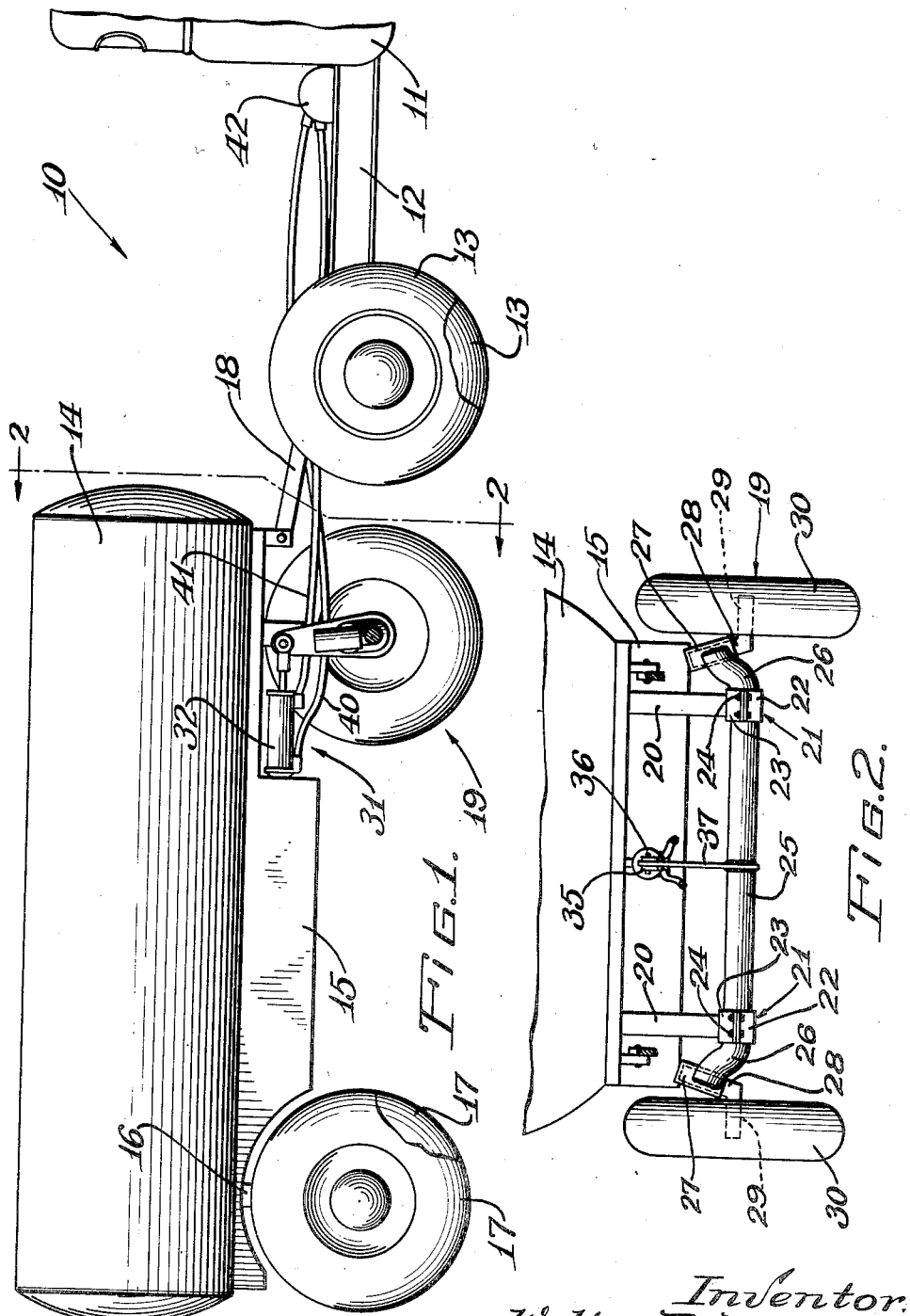
April 6, 1954
W. R. PETERSON
REVERSIBLE CASTERING WHEEL STRUCTURE WITH POWER REVERSING MECHANISM
Filed March 12, 1952
2,674,464
2 Sheets-Sheet 1
Inventor:
Walter R. Peterson April 6, 1954
W. R. PETERSON
2,674,464
REVERSIBLE CASTERING WHEEL STRUCTURE WITH POWER REVERSING MECHANISM
Filed March 12, 1952
2 Sheets-Sheet 2
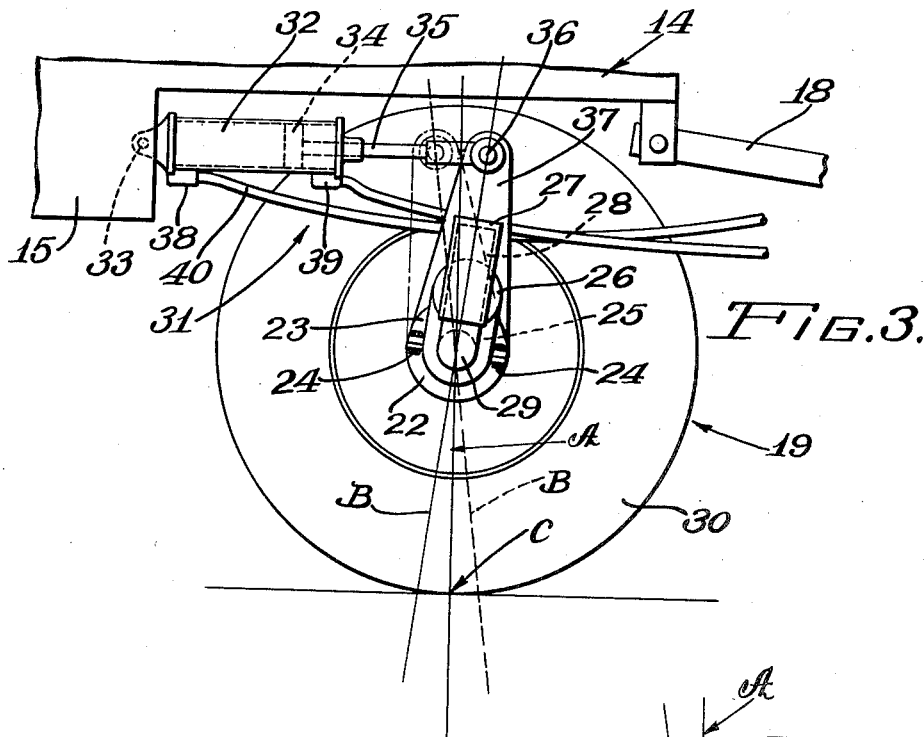
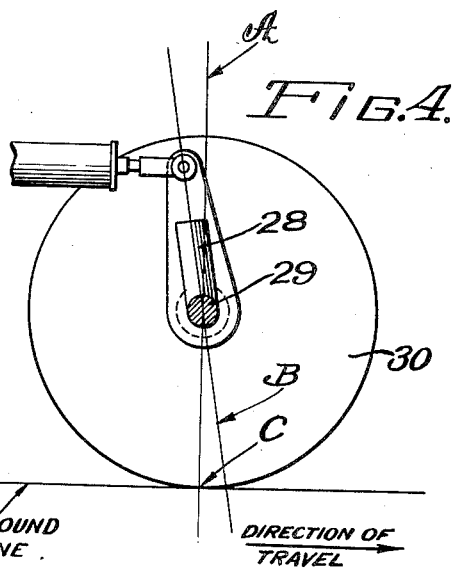
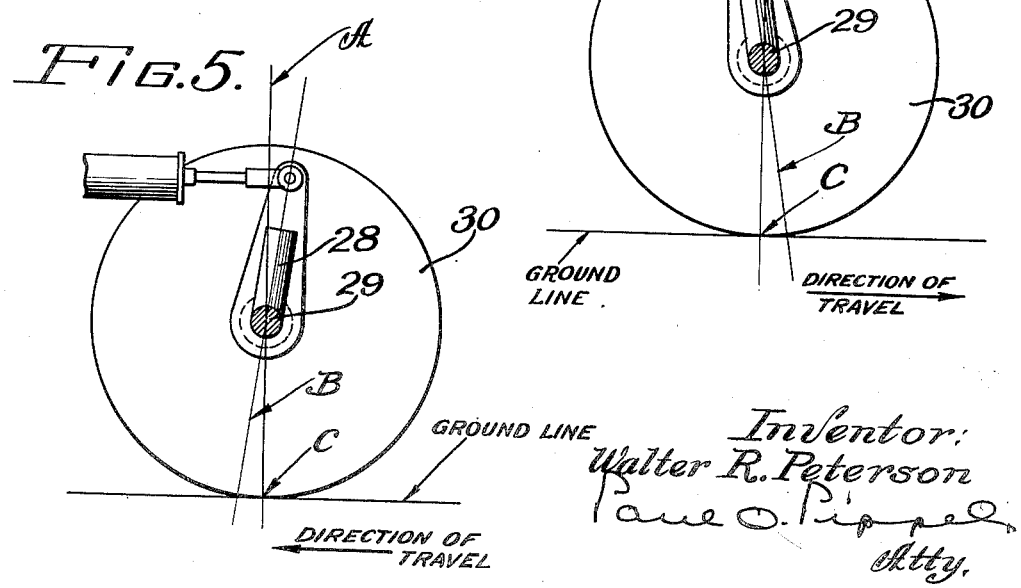
Inventor:
Walter R. Peterson
Paul O. Pippel
Atty.

2,674,464

UNITED STATES PATENT OFFICE 2,674,464

REVERSIBLE CASTERING WHEEL STRUCTURE WITH POWER REVERSING MECHANISM

Walter R. Peterson, Plainfield, Ill., assignor to International Harvester Company, a corporation of New Jersey Application March 12, 1952, Serial No. 276,187

8 Claims. (Cl. 280—80)

This invention relates to a castering wheel structure for vehicles. More specifically this invention relates to an improved castering wheel mechanism having a power reversing mechanism operative during a reversal in the direction of movement of a wheeled vehicle.

In applicant's patent application, Serial No. 221,689, entitled "Reversible Castering Wheel Structure," filed April 18, 1951, now Patent No. 2,644,697, dated July 7, 1953, an improved castering wheel structure is disclosed. As indicated in this application, in a conventional castering wheel structure the ground wheel is usually journaled on a spindle which has a vertical portion turning about a vertical axis in a socket which is rigidly supported on the vehicle. The socket normally is set forwardly of the bearing or contact point of the wheel with the ground. Thus a vertical centerline through the socket intersects the ground ahead of the contact point of the wheel, this contact point of the wheel with the ground also being conventionally referred to as the center or point of rolling resistance. The point of rolling resistance, thus, in a conventional construction, is positioned rearwardly of a vertical centerline through the spindle and socket. This construction results in a castering or tracking of the wheel. In other words, the wheel follows in the direction of movement of the vehicle in a manner which is well known to those familiar with castering wheel assemblies. The castering facility is greatly desirable in many vehicle constructions and is especially useful in connection with farm implements and trailing mechanism such as tractor trailers.

The foremost objection to a castering wheel construction is that the wheel will caster freely in one direction but upon a sudden reversal in the direction of movement difficulties will occur that to a great extent limit the usefulness of such a wheel. In order for a castering wheel to function properly on a sudden reversal of direction, the spindle will have to turn 180 degrees within its socket so that the vertical centerline of the socket is ahead of the point of rolling resistance of the wheel upon this reversal of direction. In other words, the structural conditions which readily permit a wheel to caster in one direction will have to be reversed completely if it is desired to move the castering wheel in a reversed direction. Thus, the problem of quickly reversing a castering wheel structure is of prime importance. Due to uneven ground conditions the castering wheel may be subjected to lateral thrusts or forces that will cause the wheel to drag along the ground during turning of the spindle and thus the normal advantages of a castering structure may be completely eliminated. Thus, if a driver of the vehicle suddenly decides to reverse the vehicle's direction the castering wheels would have a tendency to drag and the center of rolling resistance could not be shifted quickly enough with respect to the vertical axis of the spindle in order to effect a prompt and efficient castering action. The advantages of a conventional castering wheel structure are lost therefore where the vehicle is subject to quick reversals of direction. It is a prime object of this invention, then, to provide an improved castering wheel structure in which the castering advantages are obtained upon a sudden reversal of direction of the vehicle, the correct castering geometry being accomplished by the selective tilting of an axle to which the castering wheel is connected by means of a power mechanism.

A more specific object is to provide a quickly reversible castering wheel support wherein the point of rolling resistance of the castering wheel can quickly be reversed or changed to accommodate a reversal of direction of movement of the vehicle, the reversal of the castering wheel structure being effected by means of a power mechanism which is adapted to angularly tilt the axle of the castering wheel construction.

A more specific object of the invention is to provide a quickly reversible castering wheel structure wherein a spindle may quickly be shifted so that an axial centerline (through the spindle) is moved from one side of the point of rolling resistance or contact of the ground wheel with the ground to the other side upon a reversal in the direction of movement of the vehicle, the shifting of the spindle centerline being effected by means of a power mechanism which is selectively operative to tilt the axle.

A further specific object is to provide a castering wheel assembly for a trailing vehicle, the castering wheel assembly including a transversely extending axle which is pivotally mounted upon a pair of transversely spaced axle supports, the axle at each opposite end including a socket on which the spindle portion of a castering wheel is journaled, the spindle having a vertical centerline intersecting the ground line at a point spaced forwardly of the said contact point of the wheel with the ground when the vehicle is traversing in a forward direction, the axle being shiftable or tiltable by means of a fluid extensible device whereby the spindle is shifted so that a vertical centerline through the spindle intersects the ground line at a point spaced rearwardly of the bearing point of the wheel with the ground during rearward movement of the vehicle and castering wheel assembly.

These and further objects will become more readily apparent from a reading of the specification when taken in connection with the accompanying sheets of drawings.

In the drawings:

Figure 1 is a side elevational view of a truck, tractor and trailer combination, one of the front wheels of a castering assembly being removed to better disclose the features of the invention.

Figure 2 is a front elevational view partially in section, the view being generally taken along the line 2—2 of Figure 1.

Figure 3 is an enlarged view of a castering wheel assembly, the said view being taken in side elevation.

Figure 4 is a schematic view showing portions of a castering wheel assembly in operating position during movement of the vehicle in a first direction; and Figure 5 is a schematic view similar to Figure 4, the view showing portions of a castering wheel assembly in an operating position during movement of a vehicle in a second direction.

Referring now, particularly to Figures 1 and 2, a truck or tractor-trailer combination is generally designated by the reference character 10. The truck or tractor includes a cab 11 which is mounted on a chassis 12. The chassis 12 is supported at its rear on traction wheels 13. A trailer is generally designated at 14, the trailer including a longitudinal body 15 which is mounted at its rear on a rear axle support 16 which, in turn, is suitably supported on rear ground wheels 17. The trailer 14 is suitably connected to the chassis 12 by means of a hitch structure generally designated at 18.

The forward end of the trailer 14 is supported on a castering wheel structure generally designated at 19. As best shown in Figure 2, the castering wheel structure 19 includes a pair of laterally spaced supports 20 provided at their lower ends with bearing members 21. Each of the bearing members 21 comprises a pair of complementary collar portions 22 and 23 which are suitably connected to each other by means of bolts and nuts 24. The complementary collar parts 22 and 23 may contain suitable bearing sleeves or races (not shown) for pivotally supporting a transversely extending axle 25.

The axle 25 is provided at opposite ends with upwardly extending end portions 26. A tubular member or castering socket 27 is connected to each of the opposite ends 26 of the axle 25. The tubular member or socket 27, as indicated in Figure 2, is inclined slightly inwardly, but in the side view, as indicated in Figures 1 and 3, the socket 27 extends in substantially upward or vertical direction. A spindle or journal portion 28 is journaled within each socket 27. Each spindle portion 28 includes a laterally extending journal portion or stub axle 29 on which a ground or castering wheel 30 is journaled.

An axle reversing or shifting mechanism is generally designated by the reference character 31. The axle reversing mechanism 31 includes an extensible device in the form of a cylinder 32. The extensible device 32 is connected to the longitudinal body 15 as indicated at 33. A piston or ram 34 is reciprocally mounted within the extensible device 32. The piston 34 is connected to a piston rod 35 which projects outwardly of the extensible device 32 and is connected as indicated at 36 to a lever or arm 37. The lower arm 37, as indicated in Figure 2, is rigidly secured by welding or other fastening means to the axle 25 so that movement of the arm 37 is imparted to said axle.

The extensible device 32 is of the two-way type. A conduit connection 38 is provided at one end of the extensible device 32 and a conduit connection 39 is provided at its other end, these connections being in communication with the cylinder on opposite sides of the piston 34. Conduits 40 and 41, respectively, are connected to the connections 38 and 39, the conduits being of a flexible type and extending to a suitable source of hydraulic or pneumatic pressure such as a reservoir or pump 42.

As indicated previously in the conventional castering wheel construction the point of rolling resistance is generally known as the contact point of the castering wheel with the ground. The conventional castering wheel structure has its spindle or journal portion which is in turning engagement with the castering wheel socket longitudinally spaced from the point of rolling resistance so that a vertical centerline through the spindle intersects the ground at a point ahead of the rolling resistance during forward movement of a castering wheel. Upon a reversal of direction of movement of the castering wheel the intersecting point of the spindle must be reversed to an opposite side of the point of rolling resistance. In the conventional construction this takes place by the complete swinging of the spindle in a 180 degree arc. In the operation of the improved construction as best shown in Figures 3, 4 and 5, the movement of the spindle, in order to accommodate reversals in direction, is accomplished by means of the extensible unit 32.

Referring now, particularly to Figure 4, the castering structure can be considered as going in a forward direction, this terminology being in accordance with the disclosure of Figure 1. During the forward movement an axial centerline through the spindle journal portion 28 or through the socket 27, in which it is journaled, intersects the ground line at a point spaced forwardly of the bearing point of the wheel 30 with the ground or as conventionally called the center of rolling resistance. The vertical line A is a centerline through the stub axle 29 of the caster wheel construction. B represents an axial or vertical centerline through the spindle 28 of the castering wheel construction. C represents the contact or bearing point of the wheel or as otherwise known the center of rolling resistance. Thus, when the vehicle is traveling in a forward direction the intersection of the line B is forwardly of the center of rolling resistance C. In other words, a conventional castering action of the wheel 30 is effected when the trailer is moving in the forward direction.

Now, upon sudden reversals of direction of movement of the trailer vehicle such as may be occasioned during parking or otherwise manipulating of the unit into position, the geometry of the castering wheel structure shown in Figure 4 must be changed during such change in direction. The operator within the cab 11 has full control of the pump or reservoir 42 by suitable valve means (not shown). By actuating a control member so that fluid or air under pressure travels through the conduit 40 to the cylinder 32, the piston 34 is moved to the position shown in Figure 3 wherein the arm 37 has been moved to tilt the axle about a horizontal axis. Tilting of the axle 25, of course, also effects tilting movement of the spindle journal portion 28 as indicated in Figure 5. In this position the vertical centerline B intersects the ground line at a point spaced rearwardly of the point of rolling resistance C or the contact point of the wheel with the ground line. Thus, geometry of the castering wheel structure has so been changed that the point of rolling resistance C is now spaced forward with respect to B during rearward movement of the vehicle. By applying the terms "forwardly" and "rearwardly" in connection with the forward and rearward normal movements of the vehicle it can be seen that the vertical centerline B is spaced rearwardly with respect to the point of rolling resistance C during rearward movement of the vehicle.

It can now be seen that the spindle can be quickly reversed by means of the power mechanism so that the vertical centerline through the spindle can be positioned on opposite sides of the point of rolling resistance in a quick and effective manner to accommodate reversals in direction of the vehicle. The fluid extensible device 32 may be under the manual control of an operator or the device may be suitably connected to a valve mechanism which is automatically operable during changes in direction of movement of the vehicle to effectuate the proper control desired. The particular disclosure shown is especially effective in tractor-trailers wherein a great variety of movements and reversals in direction take place. The castering wheel structure in a tractor-trailer is especially desirable since the wheels will trail or track in an efficient manner, thus, facilitating the operation of the unit. The castering wheels, therefore, will trail when the unit is moving either in a forward or rearward direction, the castering geometry being effective by merely tilting the axle and spindle by means of the fluid extensible mechanism disclosed. It must, of course, be realized that the power means employed may vary and that other power mechanisms may be utilized for shifting the axle to its tilted position.

It can now be seen that the objects of the invention have been fully achieved. It must be understood that changes and modifications may be made without departing from the spirit of the invention as disclosed or from the scope thereof as defined in the appended claims.

What is claimed is:

1. A vehicle having a body supported on front and rear ground wheel assemblies, one of said assemblies comprising a castering support including a socket connected to said body, a castering spindle, said spindle including an upright portion and a laterally extending journal portion, said upright portion being journalled in said socket for free relative movement about a vertical axis, and a selectively operable power unit connected to said body, said power unit including a movable member connected to said socket for tilting the socket to a first position wherein a vertical centerline through the vertical axis of the spindle intersects the ground line at a point spaced forwardly of the bearing point of the wheel with the ground during forward movement of the vehicle, said power unit being movable for tilting said socket to a second position wherein a vertical centerline through the vertical axis of the spindle intersects the ground line at a point spaced rearwardly of the bearing point of the wheel with the ground during rearward movement of the vehicle.

2. In a trailer vehicle having a body a wheel assembly comprising a pair of laterally spaced axle supports connected to said body, each axle support including a bearing member, an axle journalled on said bearing members for pivotal movement about a longitudinal axis, a castering wheel structure disposed on opposite sides of said axle, each castering wheel structure including a castering socket connected to said axle, the socket normally being disposed in an upright position, a spindle having an upright portion journalled in the socket for pivotal movement about a vertical axis, said spindle including a laterally extending journal portion, a ground wheel journalled on said journal portion, means for tilting said axle to a first position wherein a vertical centerline through the vertical axis of the spindle intersects the ground line at a point spaced forwardly of the bearing point of the wheel with the ground during forward movement of the vehicle, said means including a fluid extensible device connected to said vehicle body, a reciprocable ram within said extensible device, a lever connected to said axle for movement therewith and means connecting said ram to said lever, said extensible device being adapted to tilt said axle to a second position wherein a vertical centerline through the vertical axis of the spindle intersects the ground line at a point spaced rearwardly of the bearing point of the wheel with the ground during rearward movement of the vehicle.

3. In a trailer vehicle having a body, a wheel assembly comprising a pair of laterally spaced axle supports connected to said body, each axle support including a bearing member, an axle journalled on said bearing members for pivotal movement about a longitudinal axis, a castering wheel structure disposed on opposite sides of said axle, each castering wheel structure including a castering socket connected to said axle, the socket normally being disposed in an upright position, a spindle having an upright portion journalled in the socket for pivotal movement about a vertical axis, said spindle including a laterally extending journal portion, a ground wheel journalled on said journal portion, means for tilting said axle to a first position wherein a vertical centerline through the vertical axis of the spindle intersects the ground line at a point spaced forwardly of the bearing point of the wheel with the ground during forward movement of the vehicle, said means including a fluid extensible device connected to said vehicle body, a lever connected to said axle for movement therewith and means connecting said extensible device to said lever, said extensible device being adapted to tilt said axle to a second position wherein a vertical centerline through the vertical axis of the spindle intersects the ground line at a point spaced rearwardly of the bearing point of the wheel with the ground during rearward movement of the vehicle.

4. In a trailer vehicle having a body, a wheel assembly comprising a pair of laterally spaced axle supports connected to said body, each axle support including a bearing member, an axle journalled on said bearing members for pivotal movement about a longitudinal axis, a castering wheel structure disposed on opposite sides of said axle, each castering wheel structure including a castering socket connected to said axle, the socket normally being disposed in an upright position, a spindle having an upright portion journalled in the socket for pivotal movement about a vertical axis, said spindle including a laterally extending journal portion, a ground wheel journalled on said journal portion, and means for tilting said axle to a position wherein a vertical centerline through the vertical axis of the spindle intersects the ground line at a point spaced forwardly of the bearing point of the wheel with the ground during forward movement of the vehicle, said means including a fluid extensible device connected to said vehicle body and to said axle.

5. In a trailer vehicle having a body, a wheel assembly comprising an axle extending transversely with respect to said body, means connecting said axle to said body whereby said axle may be moved bodily about its longitudinal axis, a castering wheel structure disposed on opposite sides of the axle, each castering wheel structure including a castering socket connected to said axle, a castering spindle pivoted in said socket, said spindle including a wheel carrying stub axle, a wheel journalled on the stub axle, the castering socket being normally positioned in an upright position and being tiltable with said axle, and a power actuating means including a movable member connected to said axle, said movable member being selectively movable to a plurality of positions, for tilting said axle to a position wherein a vertical centerline through the vertical axis of the spindle intersects the ground line at a point spaced forwardly of the bearing point of the wheel with the ground during forward movement of the vehicle.

6. A castering wheel structure including a movable body, a socket pivoted on said body, the axis of said socket normally extending in a vertical direction, a castering spindle, said spindle including a vertical portion journalled in said socket, a wheel carrying portion extending laterally with respect to said vertical portion, a wheel journalled on said wheel carrying portion, and means for pivoting said socket on said body, said means including a power unit selectively operable to pivot the socket to a first position wherein a vertical centerline through the vertical axis of the spindle intersects the ground line at a point spaced forwardly of the bearing point of the wheel with the ground during forward movement of the wheel, said power unit being arranged to pivot said socket to a second position wherein a vertical centerline through the vertical axis of the spindle intersects the ground line at a point spaced rearwardly of the bearing point of the wheel with the ground during rearward movement of the wheel.

7. A vehicle having a body supported on front and rear ground wheel assemblies, one of said assemblies comprising a castering support including a socket connected to said body, a castering spindle, said spindle including an upright portion and a laterally extending journal portion, said upright portion being journaled in said socket for free relative movement about a vertical axis, and a fluid extensible device connected to said body and to said castering support for tilting the socket to a first position wherein a vertical centerline through the vertical axis of the spindle intersects the ground line at a point spaced forwardly of the bearing point of the wheel with the ground during forward movement of the vehicle, said power unit being movable for tilting said socket to a second position wherein a vertical centerline through the vertical axis of the spindle intersects the ground line at a point spaced rearwardly of the bearing point of the wheel with the ground during rearward movement of the vehicle.

8. In a trailer vehicle having a body, a wheel assembly comprising an axle extending transversely with respect to said body, means connecting said axle to said body whereby said axle may be moved bodily about its longitudinal axis, a castering wheel structure disposed on opposite sides of the axle, each castering wheel structure including a castering socket connected to said axle, a castering spindle pivoted in said socket, said spindle including a wheel carrying stub axle, a wheel journaled on the stub axle, the castering socket being normally positioned in an upright position and being tiltable with said axle, and power actuating means including a fluid extensible device, a lever arm connected to said axle and to said extensible device, said lever being tiltable by said extensible device wherein a vertical centerline through the vertical axis of the spindle intersects the ground line at a point spaced rearwardly of the bearing point of the wheel with the ground during rearward movement of the vehicle.

References Cited in the file of this patent
UNITED STATES PATENTS

| Number | Name | Date |
| --- | --- | --- |
| 1,524,136 | Kapferer | Jan. 27, 1925 |